(12) United States Patent
Kang

(10) Patent No.: US 12,429,099 B2
(45) Date of Patent: Sep. 30, 2025

(54) CALIPER BRAKE

(71) Applicant: HL MANDO CORPORATION, Pyeongtaek (KR)

(72) Inventor: Dong Koo Kang, Seoul (KR)

(73) Assignee: HL MANDO CORPORATION, Pyeongtaek (KR)

(*) Notice: Subject to any disclaimer, the term of this patent is extended or adjusted under 35 U.S.C. 154(b) by 607 days.

(21) Appl. No.: 17/624,369

(22) PCT Filed: Mar. 12, 2020

(86) PCT No.: PCT/KR2020/003484
§ 371 (c)(1),
(2) Date: Jan. 3, 2022

(87) PCT Pub. No.: WO2021/006457
PCT Pub. Date: Jan. 14, 2021

(65) Prior Publication Data
US 2023/0022467 A1 Jan. 26, 2023

(30) Foreign Application Priority Data
Jul. 5, 2019 (KR) .................. 10-2019-0081622

(51) Int. Cl.
*F16D 55/226* (2006.01)
*F16D 65/18* (2006.01)
(Continued)

(52) U.S. Cl.
CPC .......... *F16D 55/226* (2013.01); *F16D 65/183* (2013.01); *F16D 2055/0016* (2013.01); *F16D 2121/04* (2013.01); *F16D 2125/08* (2013.01)

(58) Field of Classification Search
CPC ................................................. F16F 2125/08
See application file for complete search history.

(56) References Cited

U.S. PATENT DOCUMENTS

| 4,058,084 A | 11/1977 | Kawaguchi |
| 6,347,689 B1 | 2/2002 | Ohishi |

(Continued)

FOREIGN PATENT DOCUMENTS

| DE | 200913 A1 | 6/1983 |
| JP | H07253128 A | 10/1995 |

(Continued)

OTHER PUBLICATIONS

International Search Report issued on Jul. 8, 2020.
CN OA dated Dec. 13, 2023.
Office Action from Korean Patent Office, dated Nov. 15, 2024.

*Primary Examiner* — Melody M Burch
(74) *Attorney, Agent, or Firm* — Harvest IP Law, LLP

(57) ABSTRACT

Disclosed herein a caliper brake includes a carrier in which a pair of pad plates are installed to move forward and backward toward a disk; a caliper housing slidably installed on the carrier and provided with a cylinder; a piston installed in the cylinder and configured to move forward and backward toward the pair of pad plates by a braking hydraulic pressure; a seal groove formed to be recessed in an annular shape on an inner surface of the cylinder; and a seal member accommodated in the seal groove, the seal member including a front surface located in a forward direction of the piston; wherein the front surface is provided with a protrusion from which at least a part thereof protrudes.

15 Claims, 12 Drawing Sheets

(51) Int. Cl.
*F16D 55/00* (2006.01)
*F16D 121/04* (2012.01)
*F16D 125/08* (2012.01)

(56) References Cited

U.S. PATENT DOCUMENTS

| | | | |
|---|---|---|---|
| 2014/0231189 A1* | 8/2014 | Park | F16D 65/18 |
| | | | 188/72.3 |
| 2014/0231190 A1 | 8/2014 | Cesani | |
| 2018/0094683 A1* | 4/2018 | Kim | F16D 65/18 |

FOREIGN PATENT DOCUMENTS

| | | | | |
|---|---|---|---|---|
| JP | H11-280805 A | | 10/1999 | |
| JP | H11270600 A | | 10/1999 | |
| JP | 2010065785 A | | 3/2010 | |
| KR | 20100000727 A | | 1/2010 | |
| KR | 20130029827 A | * | 3/2013 | |
| KR | 10-2014-0109204 A | | 9/2014 | |
| KR | 10-2017-0067961 A | | 6/2017 | |
| KR | 2018060338 A | * | 6/2018 | ............. F16D 55/00 |
| WO | WO-2015014664 A1 | * | 2/2015 | ............. B60T 1/065 |

\* cited by examiner

[FIG. 1]
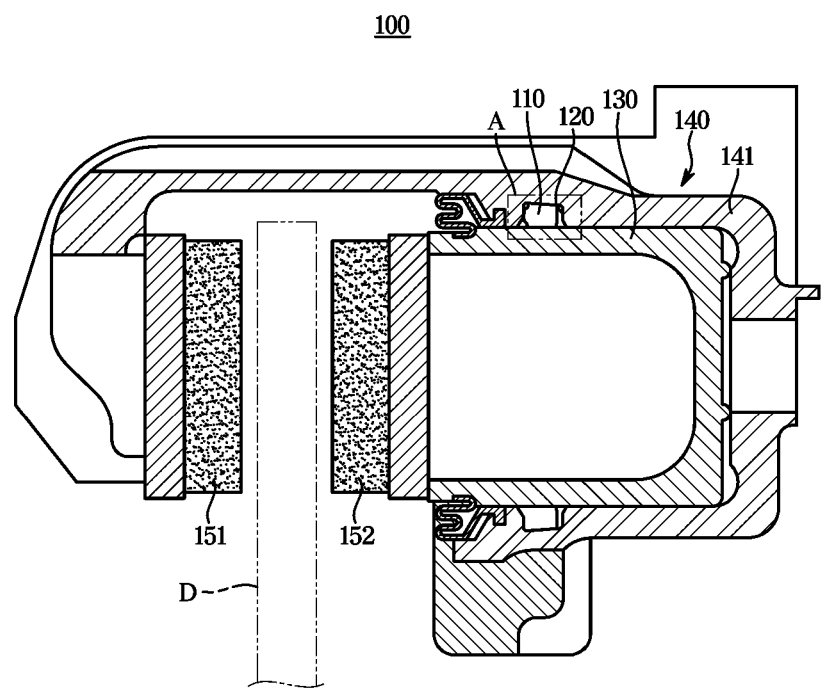

[FIG. 2]
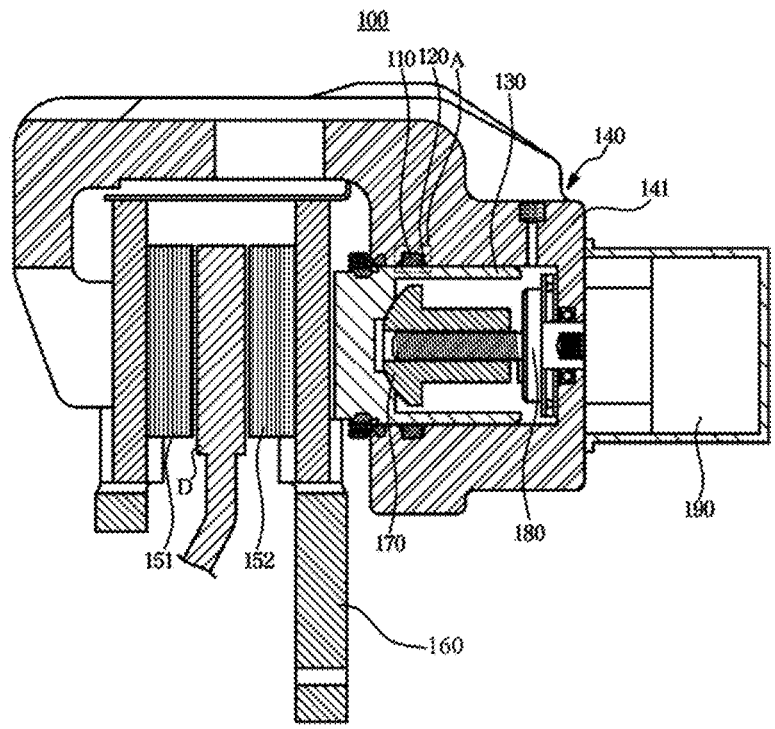
[FIG. 3]
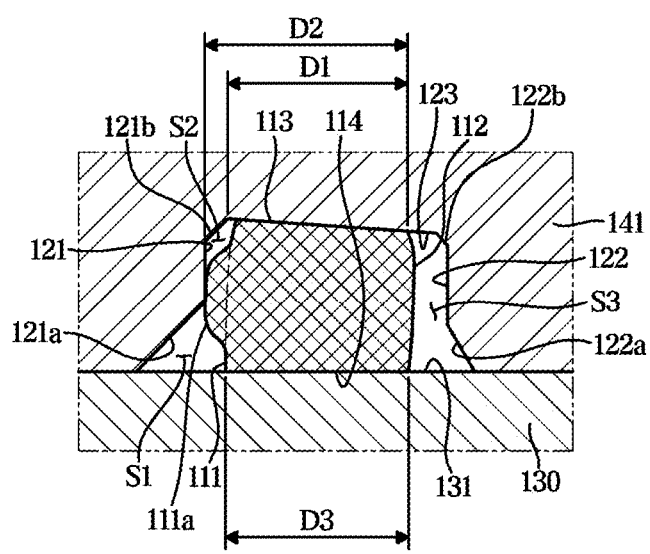

[FIG. 4]
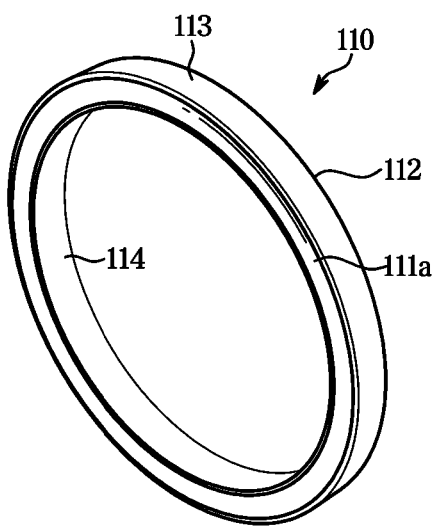
[FIG. 5]
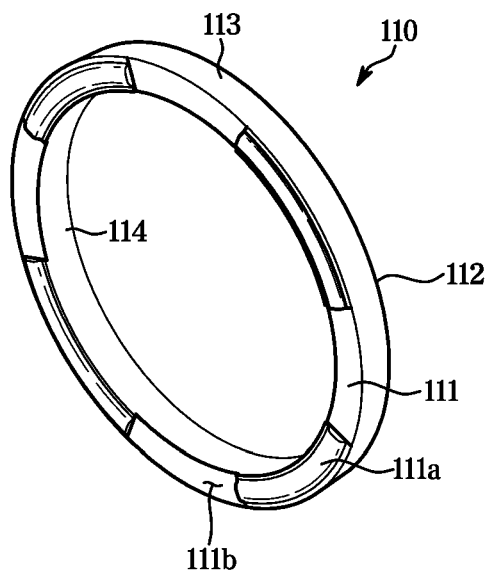

[FIG. 6]
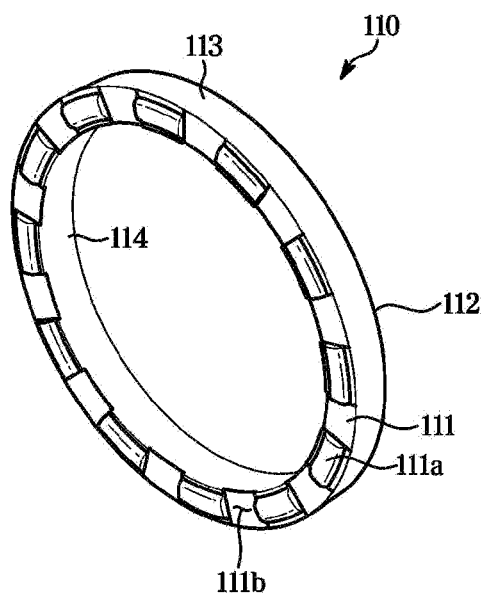
[FIG. 7]
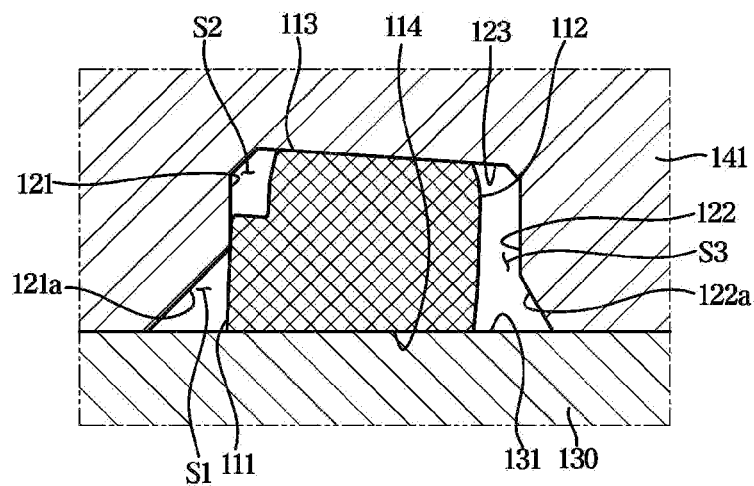

[FIG. 8]
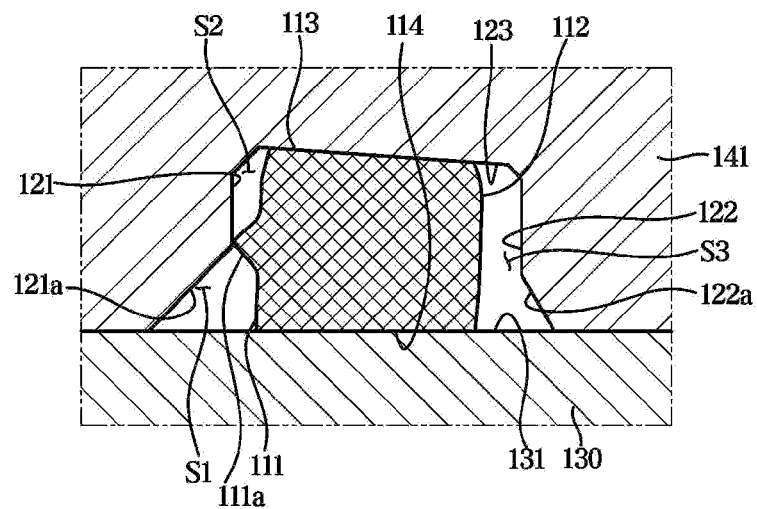
[FIG. 9]
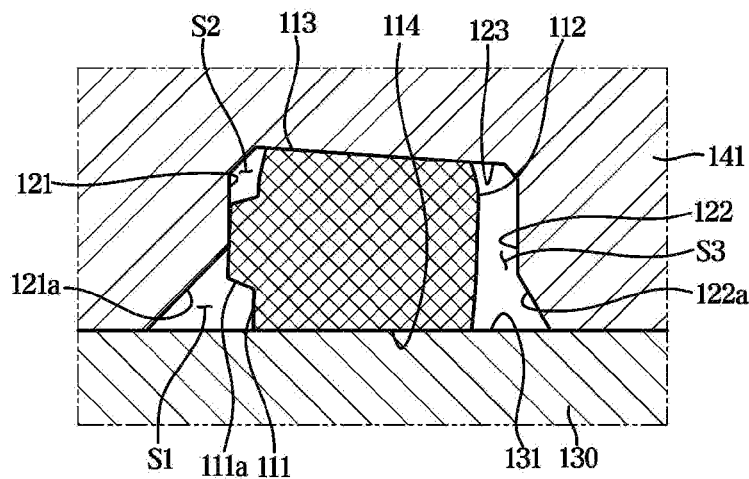

[FIG. 10]
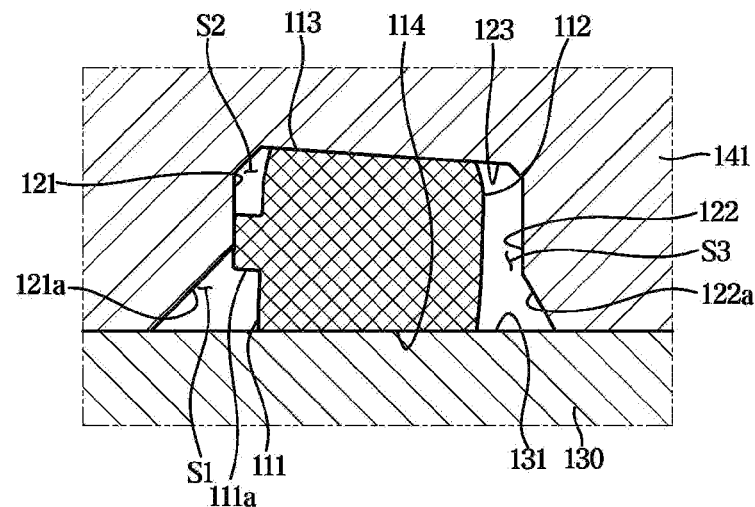
[FIG. 11]
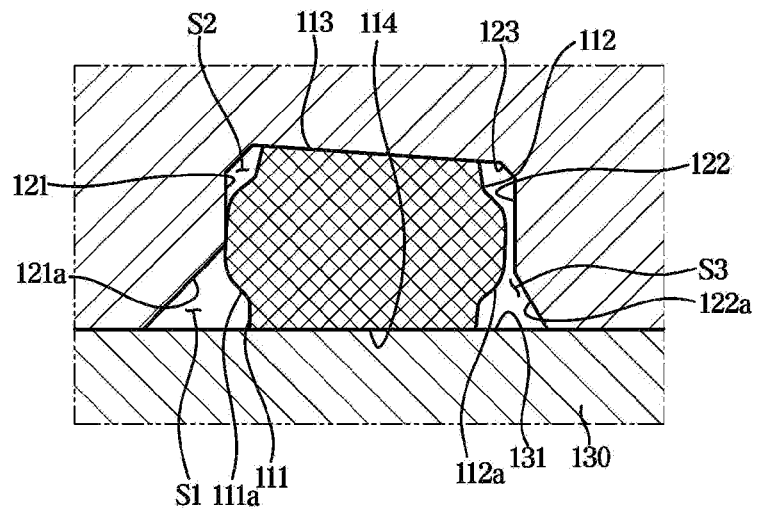

[FIG. 12]
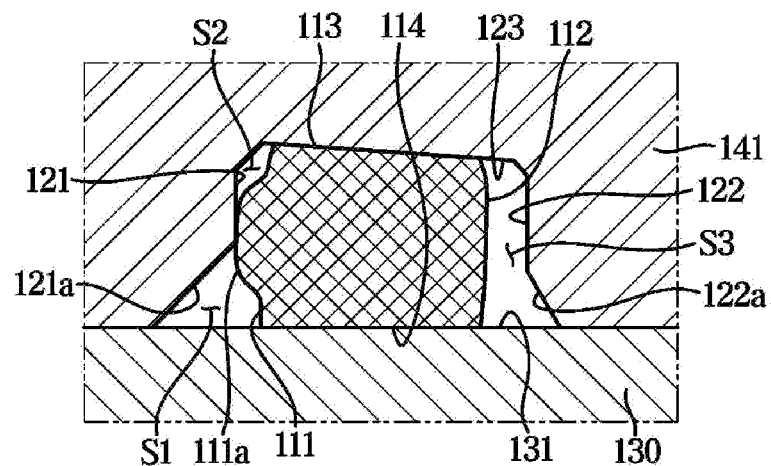
[FIG. 13]
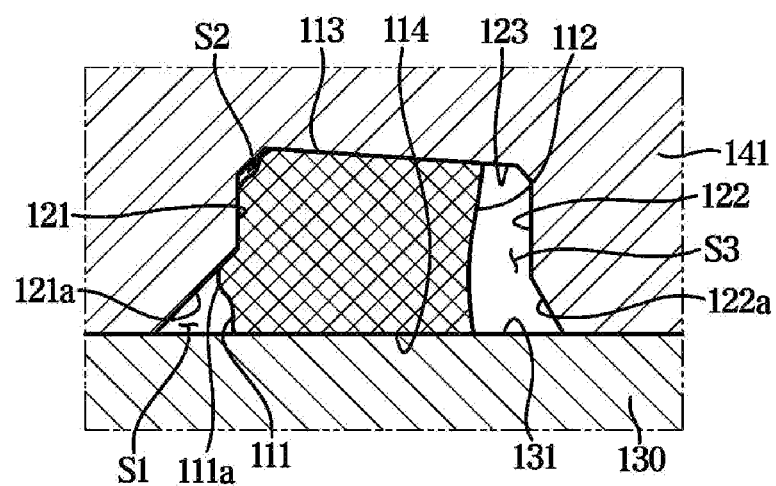

[FIG. 14]
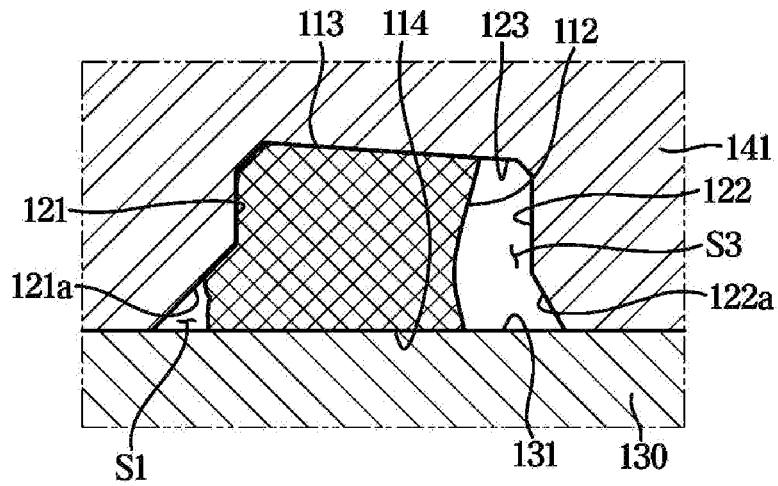
[FIG. 15]
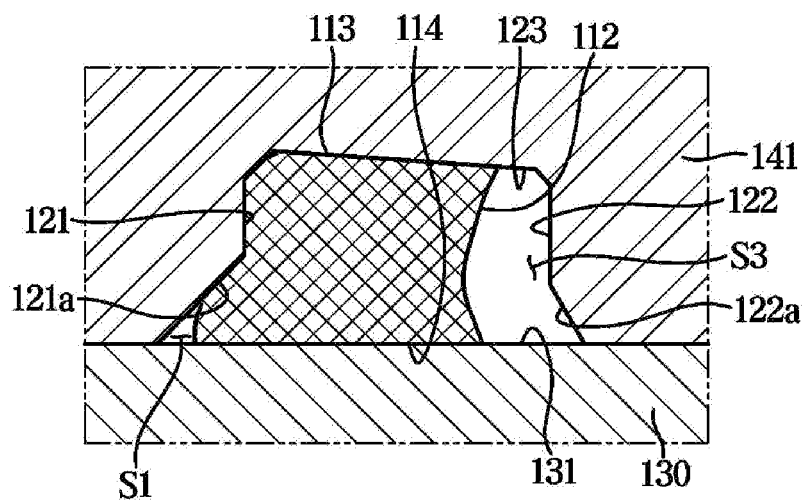

[FIG. 16]
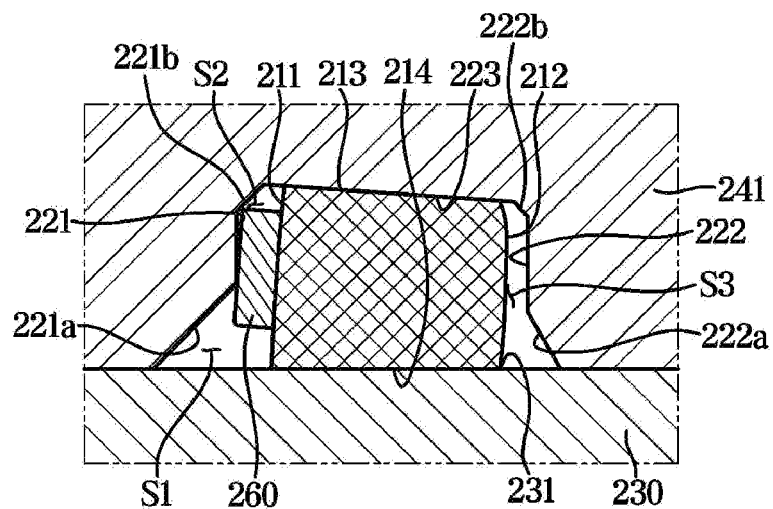
[FIG. 17]
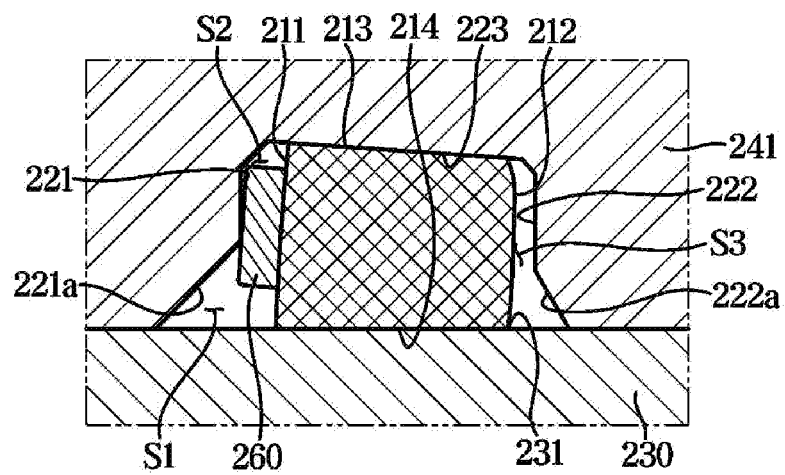

[FIG. 18]
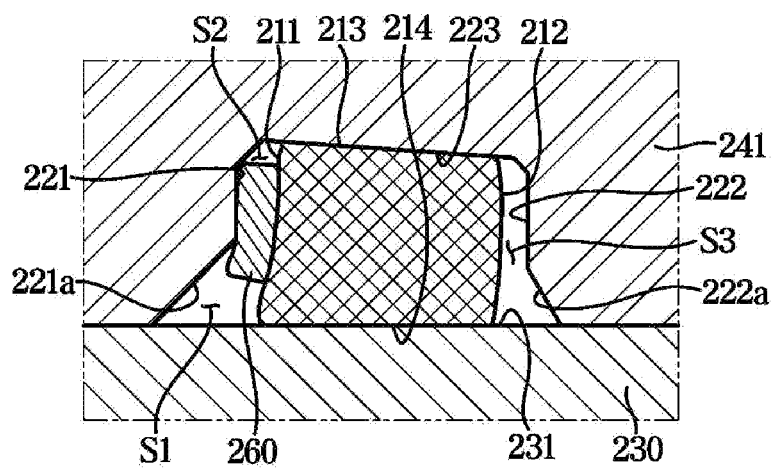
[FIG. 19]
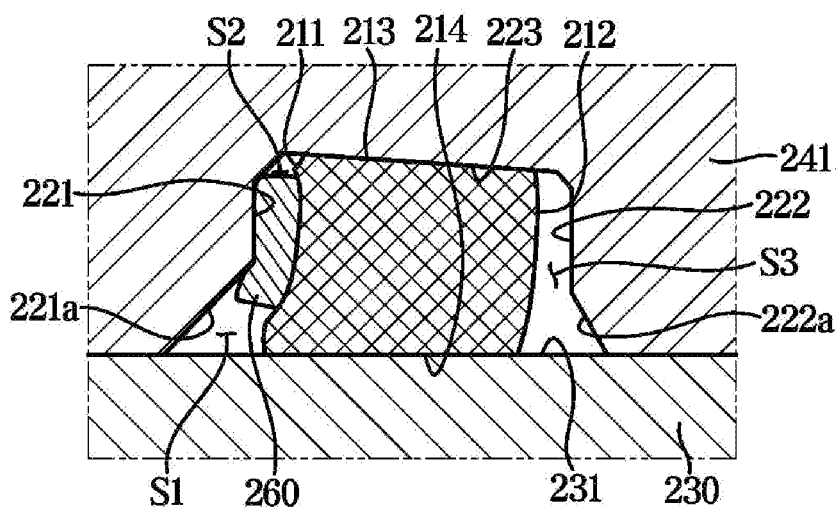

[FIG. 20]
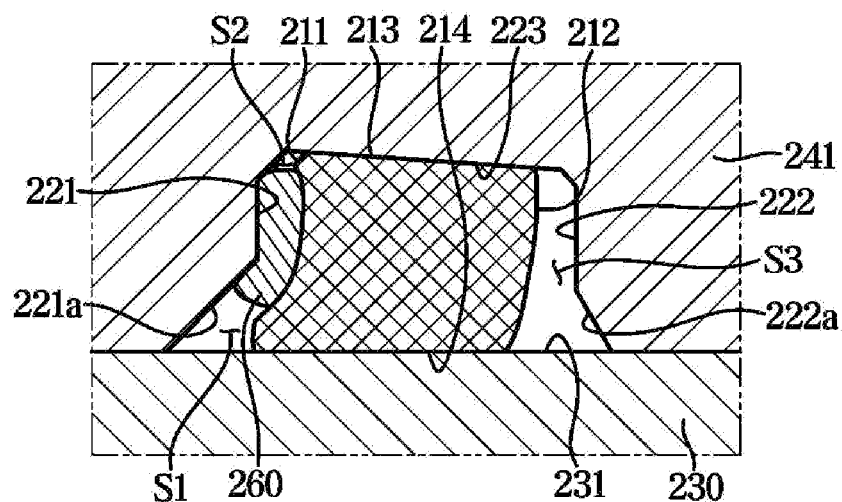
[FIG. 21]
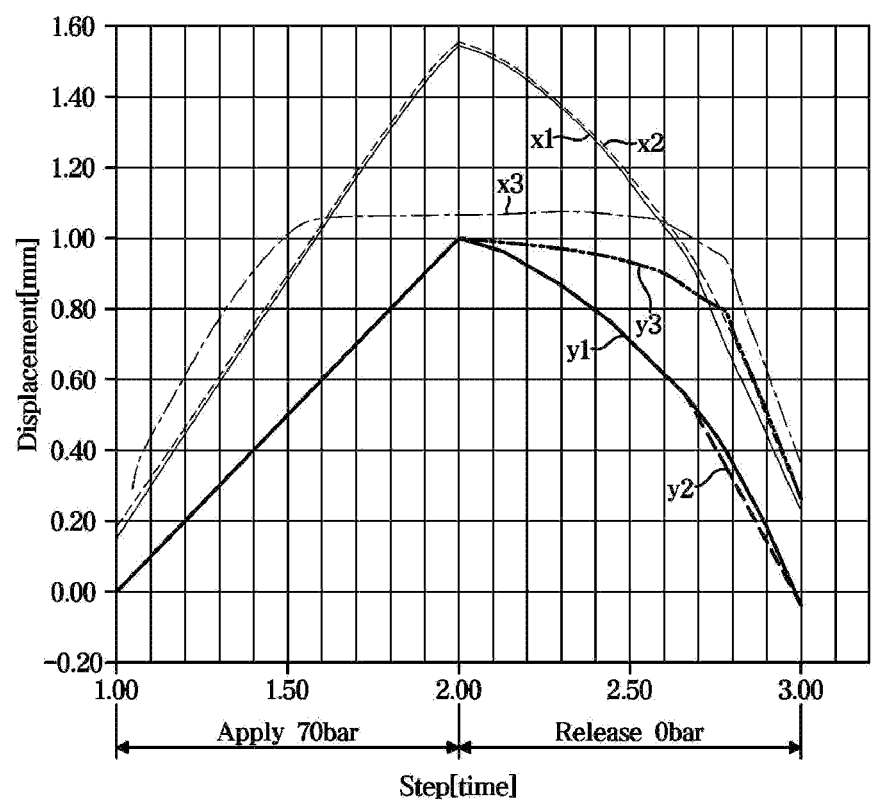

[FIG. 22]
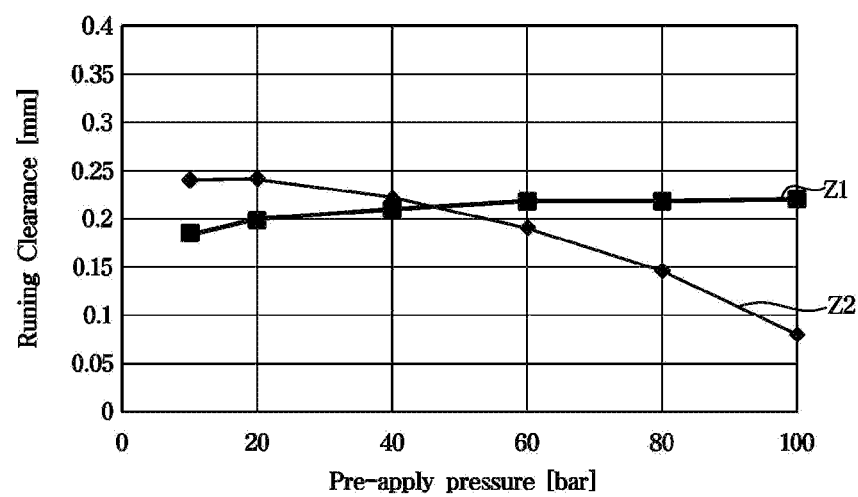

CALIPER BRAKE

CROSS-REFERENCE TO RELATED APPLICATIONS

This application is a National Stage of International Application No. PCT/KR2020/003484 filed Mar. 12, 2020, claiming priority based on Korean Patent Application No. 10-2019-0081622 filed Jul. 5, 2019.

TECHNICAL FIELD

The disclosure relates to a caliper brake, and more particularly, to a caliper brake including a seal member for rolling back a piston when braking is released.

BACKGROUND ART

In general, a caliper brake includes a disk rotating together with wheels of a vehicle, a carrier in which a pair of pad plates are installed to move forward and backward to press the disk, and a caliper housing slidably installed on the carrier. The caliper housing is provided with a cylinder in which a piston moves forward and backward by a braking hydraulic pressure.

Such a caliper brake performs a service braking that pressurizes a piston by a braking hydraulic pressure, and also performs a parking brake that pressurizes the piston using a spindle unit that employs additionally an actuator operated by electricity to receive rotational force of a motor to convert a rotational motion into a linear motion. Generally, to reduce a drag phenomenon in which friction pads, that are attached to a pair of pad plates, and a disk continue to rub after braking operation, a method of retracting the piston using a seal member accommodated in a seal groove recessed in a cylinder and a rollback chamber inside the seal groove is used.

A conventional seal member having a ring shape is inserted into an annular seal groove formed on an inner surface of a cylinder of a caliper housing, and is interposed between an inner surface of the cylinder and an outer surface of the piston. The seal member serves to seal the inner surface of the cylinder and the outer surface of the piston to prevent leakage of a braking fluid and to return the piston to its original position. After operation of braking is completed, the seal member is deformed and restored by elasticity thereof, and the piston, which has moved forward, retracts again to return its original position by the elasticity of the seal member. This is called a roll-back.

However, in a conventional caliper brake, elastic deformation of the seal member is completed during a high pressure braking, but a slip in which a piston continuously advances is occurred. Accordingly, the piston does not return smoothly when braking is released, resulting in occurring drag phenomenon in which the disk and the friction pads are rubbed. To resolve the drag phenomenon, elastic deformation movable range of the seal member may be increased by expanding an inclined surface of the seal groove positioned in a forward movement direction of the piston. However, in this case, due to increasing of a required amount of the braking fluid, when the brake pedal is operated an invalid stroke is increased and a pedal feel is reduced.

DISCLOSURE

Technical Problem

An aspect of the disclosure is to provide a caliper brake capable of fully implementing rollback performance of a seal member when braking is released in spite of a high pressure braking.

Another aspect of the disclosure is to provide a caliper brake capable of preventing a drag phenomenon and improving fuel efficiency of a vehicle by improving rollback performance of a seal member.

Another aspect of the disclosure is to provide a caliper brake capable of preventing premature deformation of a seal member during a low pressure braking to reduce an amount of braking fluid required, thereby reducing an invalid stroke and improving pedal feel of a driver.

Another aspect of the disclosure is to provide a caliper brake capable of improving rollback performance of a seal member, but not affecting assembly efficiency or shortening assembly process time.

Technical Solution

In accordance with an aspect of the disclosure, a caliper brake includes a carrier in which a pair of pad plates are installed to move forward and backward toward a disk; a caliper housing slidably installed on the carrier and provided with a cylinder; a piston installed in the cylinder and configured to move forward and backward toward the pair of pad plates by a braking hydraulic pressure; a seal groove formed to be recessed in an annular shape on an inner surface of the cylinder; and a seal member accommodated in the seal groove, the seal member including a front surface located in a forward direction of the piston, a rear face located in a backward direction of the piston, an inner circumferential surface in close contact with an outer circumferential surface of the piston, and an outer circumferential surface in close contact with a seating surface of the seal groove; wherein the front surface is provided with a protrusion from which at least a part thereof protrudes.

A thickness $D1$ of an outer end of the seal member may be smaller than a thickness $D2$ of a middle portion of the seal member.

A thickness $D3$ of an inner end of the seal member may be smaller than the thickness $D2$ of the middle portion of the seal member.

The seal groove may include the seating surface on which the outer circumferential surface of the seal member is seated, a front braking surface facing the front surface of the seal member, and a front inclined surface inclined from the front braking surface in the forward direction of the piston.

At least a part of the protrusion may be in close contact with the front braking surface when the piston moves forward.

A center part of the protrusion may be in close contact with the front braking surface when the piston moves forward.

The seal groove may be divided into a first space formed below the protrusion, a second space formed above the protrusion, and a third space provided at a rear side of the seal member.

The second space may be filled before the first space by elastic deformation of the seal member when the piston moves forward.

The protrusion may be formed to protrude at regular intervals along a circumferential direction.

The protrusion from which at least a part thereof protrudes may be provided on the rear surface of the seal member.

The seal groove may include a rear braking surface facing the rear surface of the seal member, and a rear inclined surface inclined from the rear braking surface in the backward direction of the piston.

The seal groove may further include a front chamfer inclined at a front portion of the seating surface, and a rear chamfer inclined at a rear portion of the seating surface.

In accordance with another aspect of the disclosure, a caliper brake includes a carrier in which a pair of pad plates are installed to move forward and backward toward a disk; a caliper housing slidably installed on the carrier and provided with a cylinder; a piston installed in the cylinder and configured to move forward and backward toward the pad plates by a braking hydraulic pressure; a seal member in close contact with an outer surface of the piston and an inner surface of the cylinder, the seal member having a ring-shaped; a seal groove formed to be recessed in the inner surface of the cylinder to accommodate the seal member, the seal groove including a seating surface on which an outer circumferential surface of the seal member is seated, a front braking surface facing a front surface of the seal member, and a front inclined surface formed to be inclined in a forward direction of the piston from the front braking surface; and an elastic member accommodated in the seal groove and provided in front of the seal member, the elastic member having a ring-shaped; wherein at least a part of the elastic member is in close contact with the front inclined surface when the piston moves forward.

One side of the elastic member may be provided in close contact with the front surface of the seal member, and the other side thereof may be provided in close contact with the front braking surface and the front inclined surface.

The seal groove may include a rear braking surface facing a rear surface of the seal member, and a rear inclined surface inclined from the rear braking surface in a backward direction of the piston.

The seal groove may further include a front chamfer inclined at a front portion of the seating surface, and a rear chamfer inclined at a rear portion of the seating surface.

An outer end of the elastic member may be supported by the front chamfer.

An inner space of the seal groove may be divided into a first space positioned in front of the seal member and provided between the elastic member and the piston, a second space positioned in front of the seal member and provided between the elastic member and the seating surface, and a third space positioned at a rear side of the seal member.

The second space may be filled before the first space by elastic deformation of the seal member when the piston moves forward.

The elastic member may be provided in the form of a ring having an inner diameter larger than an outer diameter of the piston, and an outer diameter thereof smaller than an inner diameter of the seal groove.

Advantageous Effects

The embodiments of the disclosure may provide the caliper brake capable of fully implementing rollback performance of the seal member when braking is released in spite of a high pressure braking.

Further, the embodiments of the disclosure may provide the caliper brake capable of preventing a drag phenomenon and improving fuel efficiency of the vehicle by improving rollback performance of the seal member.

Further, the embodiments of the disclosure may provide the caliper brake capable of preventing premature deformation of the seal member during a low pressure braking to reduce an amount of braking fluid required, thereby reducing the invalid stroke and improving pedal feel of a driver.

Further, the embodiments of the disclosure may provide the caliper brake capable of improving rollback performance of the seal member, but not affecting assembly efficiency or shortening assembly process time.

DESCRIPTION OF DRAWINGS

FIG. 1 is a schematic cross-sectional view illustrating one caliper brake according to a first embodiment of the disclosure.

FIG. 2 is a schematic cross-sectional view illustrating another caliper brake according to the first embodiment of the disclosure.

FIG. 3 is a cross-sectional view illustrating a seal member 110 and a seal groove 120 according to the first embodiment of the disclosure by enlarging part A of FIG. 1 or 2.

FIG. 4 is a perspective view illustrating the seal member 110 according to the first embodiment of the disclosure.

FIG. 5 is a perspective view illustrating a modified example of the seal member 110 according to the first embodiment of the disclosure.

FIG. 6 is a perspective view illustrating another modified example of the seal member 110 according to the first embodiment of the disclosure.

FIG. 7 is a cross-sectional view illustrating a modified example of a protrusion 111a of the seal member 110 according to the first embodiment of the disclosure.

FIG. 8 is a cross-sectional view illustrating a modified example of the protrusion 111a of the seal member 110 according to the first embodiment of the disclosure.

FIG. 9 is a cross-sectional view illustrating another modified example of the protrusion 111a of the seal member 110 according to the first embodiment of the disclosure.

FIG. 10 is a cross-sectional view illustrating another modified example of the protrusion 111a of the seal member 110 according to the first embodiment of the disclosure.

FIG. 11 is a cross-sectional view illustrating a modified example of a protrusion 112a of the seal member 110 according to the first embodiment of the disclosure.

FIG. 12 is a cross-sectional view illustrating a state of the seal member 110 before braking of a caliper brake 100 according to the first embodiment of the disclosure.

FIG. 13 is a cross-sectional view illustrating operation of the seal member 110 during a low pressure braking of the caliper brake 100 according to the first embodiment of the disclosure.

FIG. 14 is a cross-sectional view illustrating the operation of the seal member 110 during a medium pressure braking of the caliper brake 100 according to the first embodiment of the disclosure.

FIG. 15 is a cross-sectional view illustrating the operation of the seal member 110 during a high pressure braking of the caliper brake 100 according to the first embodiment of the disclosure.

FIG. 16 is a cross-sectional view illustrating a seal member 210, a seal groove 220, and an elastic member 260 according to a second embodiment of the disclosure by enlarging a part A of FIG. 1 or 2.

FIG. 17 is a cross-sectional view illustrating a state of the seal member 210 and the elastic member 260 before braking of the caliper brake 200 according to the second embodiment of the disclosure.

FIG. 18 is a cross-sectional view illustrating operation of the seal member 210 and the elastic member 260 during a low pressure braking of the caliper brake 200 according to the second embodiment of the disclosure.

FIG. 19 is a cross-sectional view illustrating operation of the seal member 210 and the elastic member 260 during a medium pressure braking of the caliper brake 200 according to the second embodiment of the disclosure.

FIG. 20 is a cross-sectional view illustrating operation of the seal member 210 and the elastic member 260 during a high pressure braking of the caliper brake 200 according to the second embodiment of the disclosure.

FIG. 21 is a graph illustrating displacements of a piston and a seal member of a conventional caliper brake and a caliper brake according to the first and second embodiments of the disclosure, according to a change in a braking hydraulic pressure.

FIG. 22 is a graph illustrating positions of a piston after a conventional caliper brake and a caliper brake according to the first embodiment of the disclosure is pressurized, according to a change in a braking hydraulic pressure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Conventionally, a seal member 110 of caliper brake is provided in a ring shape in which an outer circumferential surface 113 thereof is in close contact with an inner surface of a cylinder 141 and an inner circumferential surface 114 thereof is in close contact with an outer surface of a piston 130. At this time, the seal member 110 is generally provided in a rectangular cross-section.

The seal member 110 seals between the piston 130 and the cylinder 141 and, at the same time, performs a roll-back operation in which the piston 130 advanced by a braking hydraulic pressure returns to its original position when braking is released.

A seal groove 120 is formed to be annularly recessed on the inner surface of the cylinder 141 to accommodate the seal member 110. In particular, the seal groove 120 may include a seating surface 123 on which the outer circumferential surface 113 of the seal member 110 is seated, a front braking surface 121 facing a front surface 111 of the seal member 110, and a rear braking surface 122 facing a rear surface 112 of the seal member 110.

Furthermore, the seal groove 120 may include a front inclined surface 121a formed to be inclined in a forward direction of the piston 130 on the front braking surface 121, and a rear inclined surface 122a formed to be inclined in a backward direction of the piston 130 on the rear braking surface 122.

During a braking operation, the piston 130 advances toward a pad plate by the braking hydraulic pressure. At this time, the outer circumferential surface 113 of the seal member 110 is in close contact with the seating surface 123 of the seal groove 120, and the inner circumferential surface 114 of the seal member 110 is elastically deformed in a state in close contact with the outer circumferential surface of the piston 130.

At this time, during a high pressure braking, elastic deformation of the seal member 110 is completed in the forward direction of the piston 130, but the piston 130 continues to advance, so that a relative slip between the inner circumferential surface of the seal member 110 and the outer circumferential surface of the piston 130 may occur. Accordingly, when braking is released, the piston 130 is not relatively smoothly returned even if the seal member 110 returns to its original position, so a drag phenomenon in which friction between a disc and brake pads is generated may occur, thereby causing problems such as a decrease in fuel efficiency of a vehicle.

To solve the problem described above, a method of increasing elastic deformation movable range of the seal member 110 by expanding a width of the front inclined surface 111a and expanding a volume of a space positioned in front of the seal member 110 is proposed. However, when the seal member 110 is elastically deformed, the volume of the space behind the seal member 100 also increases, thereby causing an increase in a required amount of a braking fluid. Accordingly, new problems that an invalid stroke of a brake pedal operation is increased and a pedal feel is deteriorated is created.

Therefore, an embodiment of the disclosure is directed to provide that caliper brake 100 that improves rollback performance to reduce the drag phenomenon of the brake, and at the same time to prevent deterioration of pedal feel due to the invalid stroke of the brake pedal during the braking operation.

FIG. 1 is a cross-sectional view schematically illustrating a caliper brake according to a first embodiment of the disclosure, and FIG. 2 is a cross-sectional view schematically showing another type of caliper brake according to the first embodiment of the disclosure.

Referring to FIGS. 1 and 2, the caliper brake 100 according to the first embodiment of the disclosure includes a disc D rotating together with wheels of a vehicle, a carrier (160) in which a pair of pad plates 151 and 152 are installed to move forward and backward so as to press the disc D, a caliper housing 140 slidably installed on the carrier (160) and provided with a cylinder 141, a piston 130 installed in the cylinder 141 and provided to advance and retract toward the pad plate 152 side by the braking hydraulic pressure, a seal groove 120 formed in an annular shape on the inner surface of the cylinder 141, and a seal member 110 accommodated in the seal groove 120 and in close contact with the outer surface of the piston 130 and the inner surface of the cylinder 141.

The caliper brake according to the first embodiment of the disclosure may be provided as a device provided to implement the braking operation by hydraulic pressure as shown in FIG. 1, as well as a device provided to implement a braking operation by other manners. For example, the caliper brake may be provided to implement not only the braking operation by hydraulic pressure, but also an electromechanical braking operation of pressurizing the piston 130 with a nut 170 by rotating a spindle 180 with an actuator 190 as shown in FIG. 2.

FIG. 3 is a cross-sectional view illustrating the seal member 110 and the seal groove 120 according to the first embodiment of the disclosure by enlarging part A of FIG. 1 or 2. FIG. 4 is a perspective view illustrating the seal member 110 according to the first embodiment of the disclosure.

Referring to FIGS. 3 and 4, the seal groove 120 is formed to be annularly recessed on the inner surface of the cylinder 141 provided in a hollow shape in the caliper housing 140. Furthermore, the seal groove 120 accommodates the seal member 110, and the seal member 110 is interposed between the seal groove 120 and the piston 130 to be in close contact.

Particularly, the seal groove 120 may include the seating surface 123 on which the outer circumferential surface 113 of the seal member 110 is seated, and the front braking surface 121 opposite to the front surface 111 of the seal member 110, and a rear braking surface 122 opposite to the rear surface 112 of the seal member 110.

The seating surface 123 may closely support the outer circumferential surface 113 of the seal member 110 so that the seal member 110 may be elastically deformed through friction with the seal member 110. Furthermore, the seating surface 123 may be inclined so that an inner diameter thereof increases toward the front braking surface 121 side. Accordingly, it prevents the piston 130 from being excessively rolled back when the seal member 110 is returned, thereby preventing a distance between the piston 130 and the pad plate 152 from getting farther away.

The front braking surface 121 may be bent with angled shape from the seating surface 123 to the piston 130 side to face the front surface 111 of the seal member 110. Herein, the front braking surface 121 may normally maintain a state in close contact with at least a part of the protrusion 111a of the seal member 110, and when the piston 130 moves forward (during the braking operation), the at least a part of the protrusion 111a is in close contact with the front braking surface 121 and elastically deformed. Preferably, a center part of the protrusion 111a or the most protruding part of the protrusion 111a may be in close contact with the front braking surface 121 when the piston 130 moves forward.

Furthermore, during the braking operation, the front braking surface 121 may be in close contact with the front surface 111 as well as the protrusion 111a of the seal member 110 due to elastic deformation of the seal member 110 to limit the movement of the seal member 110. The rear braking surface 122 may be bent with angled shape from the seating surface 123 to the piston 130 side to face the rear surface 112 of the seal member 110. Herein, the rear braking surface 122 may maintain a spaced apart state from the seal member 110 in normal, and when the seal member 110 is excessively rolled back by elastic repulsive force while the piston 130 moves backward (when the braking is released), the rear braking surface 122 may be in close contact with the rear surface 112 of the seal member 110 to limit movement thereof.

The front braking surface 121 and the rear braking surface 122 of the seal groove 120 may be formed in parallel.

Furthermore, the seal groove 120 may further include the front inclined surface 121a formed to be inclined in the forward direction of the piston 130 from the front braking surface 121 and the rear inclined surface 122a formed to be inclined in the backward direction of the piston 130 from the rear braking surface 122.

The front inclined surface 121a may be formed from the front braking surface 121, and may be inclined at about 45 degrees in the forward direction of the piston 130 from a depth of about half the depth at which the seating surface 123 is formed. However, the shape of the front inclined surface 121a is not limited thereto, and various modifications are possible, and the depth and angle of the front inclined surface 121a may be changed according to a rollback amount required, and should be understood in the same way.

The front inclined surface 121a of the seal groove 120 may maintain a state in close contact with a part of the protrusion 111a according to the shape and position of the protrusion 111a of the seal member 110. In addition, the front inclined surface 121a is in close contact with not only the protrusion 111a of the seal member 110 but also the front surface 111 thereof due to elastic deformation of the seal member 110 when the piston 130 moves forward (during the braking operation) to limit the movement of the seal member 110.

The rear inclined surface 122a may be formed from the rear braking surface 122, and may be inclined at about 60 degrees in the backward direction of the piston 130 from a depth that is less than half of the depth at which the seating surface 123 is formed. However, the shape of the rear inclined surface 122a is not limited thereto, and various modifications are possible, and the depth and angle of the rear inclined surface 122a may be changed according to the required amount of the braking fluid required, and should be understood in the same way.

The seal groove 120 may further include a front chamfer 121b that is formed to be inclined at a portion where the front braking surface 121 and the seating surface 123 are connected, and a rear chamfer 122b that is formed to be inclined at a portion where the rear braking surface 121 and the seating surface 123 are connected.

The seal member 110 provided in a ring shape is accommodated in the seal groove 120, the inner circumferential surface 114 thereof may be in close contact with the outer surface of the piston 130, and the outer circumferential surface 113 thereof may be in close contact with the inner surface of the seal groove 120.

The seal member 110 includes the front surface 111 located in the forward direction (hereinafter referred to as a front side) of the piston 130 and a rear surface 112 located in the backward direction (hereinafter referred to as a rear side) of the piston 130.

The seal member 110 may be caught and supported by the front chamfer 121b when moving forward, and may be caught and supported by the rear chamfer 122b when moving backward (See FIG. 3).

At least a part of the front surface 111 of the seal member 110 may be formed to protrude in the forward direction of the piston 130. More specifically, the seal member 110 may include the protrusion 111a protruding from the front surface 111 in the forward direction of the piston 130, and the protrusion 111a may be formed to protrude in the middle of the front surface 111. Furthermore, the protrusion 111a may be provided in close contact with at least one of the front braking surface 121 and the front inclined surface 121a of the seal groove 120.

As shown in the drawings, the protrusion 111a may be formed to protrude from the front surface 111 and be rounded. In particular, a protruding edge of the protrusion 111a is formed to be rounded, so that durability loss due to wear is less likely to occur even if the forward and backward movements of the piston 130 and the seal member 110 are repeated.

Since the protrusion 111a is integrally provided as a part of the body of the seal member 110, assembly efficiency and assembly time of the seal member 110 are not affected. In other words, since the protrusion 111a is not formed as a separate member, the assembly efficiency of the conventional seal member is not affected.

However, the front surface 111 of the seal member 110 may be formed to protrude in various shapes unlike shown in the drawings, a plurality of projections 111a may be formed, and if a portion of the front surface 111 is in close contact with the seal groove 120 due to the protrusion of the front surface 111, it should be understood in the same way.

As shown in FIG. 4, the protrusion 111a is formed to protrude from the front surface 111 of the seal member 110, and may be formed to protrude continuously along a circumferential direction thereof.

Furthermore, as shown in FIGS. 5 and 6, the protrusion 111a may be provided to protrude from the front surface 111 of the seal member 110, and may include at least one slit 111b in a radial direction. At this time, a spacing between the protrusion 111a and the slit 111b may be variously changed, and should be understood in the same way. As described above, the seal member 110 has the protrusion 111a formed in the middle portion, so that the middle portion may have a greater thickness than outer end and inner end. In particularly, the seal member 110 may be formed such that a thickness D1 of the outer end is smaller than a thickness D2 of the middle portion, and the seal member 110 may be formed such that a thickness D3 of the inner end is smaller than the thickness D2 of the middle portion.

The protrusion 111a of the seal member 110 is provided in close contact with at least one of the front braking surface 121 and the front inclined surface 121a of the seal groove 120, and because the outer circumferential surface 113 of the seal member 110 is in close contact with the seating surface 123, an inner space of the seal groove 120 may be divided into a first space S1 to a third space S3 by the seal member 110.

Specifically, the inner space of the seal groove 120 may be divided into the first space S1 positioned in front of the seal member 110 and provided between the seal member 110 and the piston 130, the second space S2 positioned in front of the seal member 110 and provided between the front braking surface 121, the protrusion 111a and the seating surface 123, and the third space S3 positioned at the rear of the seal member 110. At this time, the first space S1 may have a larger volume than that of the second space S2.

The first space S1 and the second space S2 are partitioned due to the protrusion 111a, which not only prevents premature deformation of the seal member 110, but also ensures additionally a space in which the seal member 110 may be deformed to improve rollback performance.

The first and second spaces S1 and S2 are filled with the seal member 110 due to elastic deformation of the seal member 110 during the braking operation, so that the volume of the first and second spaces S1 and S2 may be decreased, and the volume of the third space S3 may be increased. Conversely, the volume of the first and second spaces S1 and S2 may be increased due to the returning to its original state of the seal member 110 when braking is released, and the volume of the third space S3 may be decreased.

FIGS. 7 to 11 are cross-sectional views illustrating modified examples of the protrusion 111a of the seal member 110 according to the first embodiment of the disclosure. As shown in FIG. 7, the protrusion 111a is formed on the front surface 111 of the seal member 110, and may be provided as a protrusion having a rectangular cross-section and protruding from a center to the inner circumferential surface 114 thereof.

As shown in FIG. 8, the protrusion 111a is formed on the front surface 111 of the seal member 110, and may be provided in a shape in which a vertex faces the front braking surface 121 and a cross section thereof is formed in a triangular shape.

As shown in FIG. 9, the protrusion 111a is formed on the front surface 111 of the seal member 110, and may be provided as a trapezoidal protrusion whose width becomes narrower as it protrudes.

As shown in FIG. 10, the protrusion 111a is formed on the front surface 111 of the seal member 110, and may be provided as a protrusion protruding from the center and having a rectangular cross-section.

As shown in FIG. 11, the seal member 110 may include not only the protrusions 111a formed on the front surface 111, but also a protrusion 112a protruding toward the rear braking surface 122 on the rear surface 112. At this time, the seal member 110 may be provided so that the front and the rear sides are symmetrical, which has the effect of improving the assembly efficiency because distinguishing the front and the rear is not necessary when the seal member 110 is assembled.

Next, the operation of the seal member 110 during the braking operation of the caliper brake 100 according to the first embodiment of the disclosure will be described.

FIGS. 12 to 15 are cross-sectional views sequentially illustrating the operation of the seal member 110 during the braking operation of the caliper brake 100 according to the first embodiment of the disclosure.

FIGS. 12 to 15 may be seen that the piston 130 advances from a stationary state as the braking hydraulic pressure changes from a low pressure (about 20 to 40 bar) to a high pressure (about 70 bar), and thus, the seal member 110 is elastically deformed gradually.

Specifically, in the stationary state, the protrusion 111a of the seal member 110 is maintained in close contact with at least one of the front braking surface 121 and the front inclined surface 121a, and the first space S1, the second space S2 and the third space S3 are separated from each other.

During the braking operation, the seal member 110 elastically deforms in a state in which the outer and inner circumferential surfaces 113 and 114 thereof are in close contact with the seating surface 123 of the seal groove 120 and the outer circumferential surface of the piston 130, respectively. Furthermore, the seal member 110 moves to the first and second spaces S1 and S2, and thus the volume of the first and second spaces S1 and S2 decrease. At this time, since the first space S1 has a larger volume than that of the second space S2 due to the front inclined surface 121a, the second space S2 may be filled before the first space S1.

During the high pressure braking, a part of the front surface 111 of the seal member 110 is completely in close contact with the front braking surface 121 of the seal groove 120, and the remaining part thereof moves toward the front inclined surface 121a to fill the second space S2.

The operation while releasing of the braking is performed opposite to the braking operation described above.

Accordingly, the seal member 110 according to the first embodiment of the disclosure may be continuously elastically deformed not only under the low pressure braking but also under the high pressure braking, and prevent a slip phenomenon in which the piston 130 moves relative to the seal member 110 even at high pressure.

Furthermore, the seal member 110 according to the first embodiment of the disclosure is structurally elastically deformed to fill not only the first space S1 but also the second space S2 during the low pressure braking, so that the volume of the third space S3 does not increase significantly, which prevents an increase in the required amount of the braking fluid during the low pressure braking, thereby reducing the invalid stroke and preventing a decrease in pedal feel.

Hereinafter, the caliper brake 200 according to a second embodiment of the disclosure will be described.

FIG. 16 is a cross-sectional view illustrating a seal member 210, a seal groove 220 and an elastic member 260 of a caliper brake 200 by enlarging part A of FIG. 1 or FIG. 2.

Referring to FIGS. 1, 2 and 16, the caliper brake 200 according to the second embodiment of the disclosure includes a disc D rotating together with wheels (not shown) of the vehicle, a carrier (160) in which the pair of pad plates 151 and 152 are installed to move forward and backward so as to press the disc D, a caliper housing 240 slidably installed on the carrier (160) and provided with a cylinder 241, a piston 230 installed in the cylinder 241 and provided to advance and retract toward the pad plate 152 side by the braking hydraulic pressure, a seal groove 220 formed in an annular shape on the inner surface of the cylinder 241, a seal member 210 accommodated in the seal groove 220 and in close contact with an outer surface of the piston 230 and an inner surface of the cylinder 241, and an elastic member 260 accommodated in the seal groove 220 and provided in front of the seal member 210 and interposed between the seal member 210 and the seal groove 220.

The seal groove 220 is formed to be annularly recessed on the inner surface of the cylinder 241 provided in a hollow shape in the caliper housing 240. Furthermore, the seal groove 220 accommodates the seal member 210 and the elastic member 260, the seal member 210 is interposed between the seal groove 220 and the piston 230 to be in close contact, and the elastic member 260 is interposed between the seal member 210 and the seal groove 220 to be in close contact.

Particularly, the seal groove 220 may include a seating surface 223 on which an outer circumferential surface 213 of the seal member 210 is seated, and a front braking surface 221 facing a front surface 211 of the seal member 210, and a rear braking surface 222 facing a rear surface 212 of the seal member 210.

The seating surface 223 may closely support the outer circumferential surface 213 of the seal member 210 so that the seal member 210 may be elastically deformed through friction with the seal member 210. Furthermore, the seating surface 223 may be inclined so that an inner diameter thereof increases toward the front braking surface 221 side. Accordingly, it prevents the piston 230 from being excessively rolled back when the seal member 210 is returned, thereby preventing a distance between the piston 230 and the pad plate 152 from getting farther away. The front braking surface 221 may be bent with angled shape from the seating surface 223 to the piston 230 side to face the front surface 211 of the seal member 210. Herein, the front braking surface 221 may maintain a state in close contact with at least a part of the elastic member 260 in normal, and when the piston 230 moves forward (during the braking operation), the at least a part of the elastic member 260 is in close contact with the front braking surface 221 and elastically deformed. Preferably, a center part of the elastic member 260 may be in close contact with the front braking surface 221 when the piston 230 moves forward.

Furthermore, during the braking operation, the front braking surface 221 may be in close contact with the front surface 211 of the seal member 210 due to elastic deformation of the seal member 210 to limit the movement of the seal member 210.

The rear braking surface 222 may be bent with angled shape from the seating surface 223 to the piston 230 side to face the rear surface 212 of the seal member 210. Herein, the rear braking surface 222 may maintain a spaced apart state from the seal member 210 in normal, and when the seal member 210 is excessively rolled back by elastic repulsive force while the braking is released, the rear braking surface 222 may be in close contact with the rear surface 212 of the seal member 210 to limit movement thereof.

The front braking surface 221 and the rear braking surface 222 of the seal groove 220 may be formed in parallel.

Furthermore, the seal groove 220 may further include a front inclined surface 221a formed to be inclined in the forward direction of the piston 230 from the front braking surface 221 and a rear inclined surface 222a formed to be inclined in the backward direction of the piston 230 from the rear braking surface 222.

The front inclined surface 221a may be formed from the front braking surface 221, and may be inclined at about 45 degrees in the forward direction of the piston 230 from a depth of about half the depth at which the seating surface 223 is formed. However, the shape of the front inclined surface 221a is not limited thereto, and various modifications are possible, and the depth and angle of the front inclined surface 221a may be changed according to the rollback amount required, and should be understood in the same way.

The front inclined surface 221a of the seal groove 220 may maintain a state in close contact with at least a part of the elastic member 260, and when the piston 230 moves forward the front inclined surface 221a is in close contact with the front surface 211 of the seal member 210 due to elastic deformation of the seal member 210 to limit the movement of the seal member 210.

The rear inclined surface 222a may be formed from the rear braking surface 222, and may be inclined at about 60 degrees in the backward direction of the piston 230 from a depth that is less than half of the depth at which the seating surface 223 is formed. However, the shape of the rear inclined surface 222a is not limited thereto, and various modifications are possible, and the depth and angle of the rear inclined surface 222a may be changed according to the required amount of the braking fluid required, and should be understood in the same way.

The seal groove 220 may further include a front chamfer 221b that is formed to be inclined at a portion where the front braking surface 221 and the seating surface 223 are connected, and a rear chamfer 122b that is formed to be inclined at a portion where the rear braking surface 221 and the seating surface 223 are connected.

The seal member 210 is accommodated in the seal groove 220, and the inner circumferential surface thereof may be in close contact with the outer surface of the piston 230, and the outer circumferential surface thereof may be provided in a ring shape in close contact with the inner surface of the seal groove 220.

The seal member 210 includes the front surface 211 located in the forward direction of the piston 230 and the rear surface 212 located in the backward direction of the piston 230.

The seal member 210 may be caught and supported by the front chamfer 221b when moving forward, and may be caught and supported by the rear chamfer 222b when moving backward (See FIG. 16).

The front surface 211 and the rear surface 212 of the seal member 210 may be provided to be flat and parallel to the front braking surface 221 and the rear braking surface 222 of the seal groove 220. Furthermore, the cross-section of the seal member 210 may be preferably provided in a rectangular shape.

The elastic member 260 may be provided in a ring shape having an inner diameter thereof larger than the outer circumferential surface 231 of the piston 230 and smaller than an inner diameter of the seating surface 223 side of the seal groove 220. Furthermore, the elastic member 260 may be made of, for example, a polymer material such as a fluorine rubber or a silicone rubber.

One side of the elastic member 260 may be provided in close contact with the front surface 211 of the seal member 210, and the other side thereof may be provided in close contact with at least one of the front braking surface 221 and the front inclined surface 221a of the seal groove 220.

Furthermore, at least a part of the outer circumferential surface of the elastic member 260 may be supported by the front chamfer 221b. Specifically, a front side of the outer circumferential surface of the elastic member 260 may be supported by the front chamfer 221b so that the elastic member 260 may be maintained in a spaced apart state without being in close contact with the seating surface 213.

The cross-section of the elastic member 260 may be formed in various shapes different from those shown in the drawings, and various deformations such as an oval and hexagonal cross-section are possible, and if the elastic member 260 is interposed between the seal member 210 and the seal groove 220 and is in close contact, it should be understood in the same way.

Since one side of the elastic member 260 is provided in close contact with the front surface 211 of the seal member 210 and the other side thereof is provided in close contact with at least one of the front braking surface 221 and the front inclined surface 221a of the seal groove 220, an inner space of the seal groove 220 may be divided into a first space S1 to a third space S3. Specifically, the inner space of the seal groove 220 may be divided into the first space S1 positioned in front of the seal member 210 and provided between the elastic member 260 and the piston 230, the second space S2 positioned in front of the seal member 210 and provided between the elastic member 260 and a horizontal surface, and the third space S3 positioned at the rear of the seal member 210. At this time, the first space S1 may have a larger volume than that of the second space S2.

The volume of the first and second spaces S1 and S2 may be decreased due to elastic deformation of the elastic member 260 and the seal member 210 during the braking operation, and the volume of the third space S3 may be increased. Conversely, the volume of the first and second spaces S1 and S2 may be increased due to the returning to their original state of the elastic member 260 and the seal member 110 when braking is released, and the volume of the third space S3 may be decreased.

Next, operations of the elastic member 260 and the seal member 210 during the braking operation of the caliper brake 200 according to the second embodiment of the disclosure will be described.

FIGS. 17 to 20 are cross-sectional views sequentially illustrating the operations of the elastic member 260 and the seal member 210 during the braking operation of the caliper brake 200 according to the second embodiment of the disclosure.

FIGS. 17 to 20 may be seen that the piston 230 advances from a stationary state as the braking hydraulic pressure changes from a low pressure (about 20 to 40 bar) to a high pressure (about 70 bar), and thus, the elastic member 260 and the seal member 210 is elastically deformed gradually.

Specifically, in the stationary state, the elastic member 260 is maintained in close contact with at least one of the front braking surface 221 and the front inclined surface 221a, and the first space S1, the second space S2 and the third space S3 are maintained in a separated state, respectively.

During the braking operation, the seal member 210 elastically deforms in a state in which the outer and inner circumferential surfaces 213 and 214 thereof are in close contact with the seating surface 223 of the seal groove 220 and the outer circumferential surface 231 of the piston 230, respectively. Furthermore, the elastic member 260 and the seal member 110 move to the first and second spaces S1 and S2, and thus the volume of the first and second spaces S1 and S2 decrease. At this time, since the first space S1 has a larger volume than that of the second space S2 due to the front inclined surface, the second space S2 may be filled before the first space S1.

During the high pressure braking, a part of the front surface 211 of the seal member 210 is completely in close contact with the front braking surface 221 of the seal groove 220, and the remaining part thereof moves toward the front inclined surface 221a to fill the second space S2.

The operation while releasing of the braking is performed opposite to the braking operation described above.

Accordingly, the seal member 210 according to the second embodiment of the disclosure may be continuously elastically deformed not only under the low pressure braking but also under the high pressure braking, and prevent a slip phenomenon in which the piston 230 moves relative to the seal member 210 even at high pressure.

Furthermore, the seal member 210 according to the second embodiment of the disclosure is structurally elastically deformed to fill not only the first space S1 but also the second space S2 during the low pressure braking, so that the volume of the third space S3 does not increase significantly, which prevents an increase in the required amount of the braking fluid during the low pressure braking, thereby reducing the invalid stroke and preventing a decrease in pedal feel.

FIG. 21 is a graph illustrating displacements of the piston 130 and the seal member 110 of the caliper brake 100 of according to first and second embodiments of the disclosure and a conventional caliper brake 100, according to a change in the braking hydraulic pressure.

FIG. 21 shows a displacement x1 of the seal member of the first embodiment, a displacement x2 of the seal member of the second embodiment, a displacement x3 of the seal member of the conventional embodiment, a displacement y1 of the piston of the first embodiment, a displacement y2 of the piston of the second embodiment, and a displacement y3 of the piston of the conventional embodiment As shown in FIG. 21, looking at the displacements y3 and x3 of the piston 130 and the seal member 110 of the conventional caliper brake according to the change in the braking hydraulic pressure, as the braking hydraulic pressure of 70 bar is applied (1 second to 2 seconds), the displacement y3 of the piston increases linearly and finally the displacement y3 reaches 1 mm. At this time, the displacement x3 of the seal member starts from 0.2 mm and increases linearly, and first reaches about 1 mm (about 1.5 seconds), so no further displacement occurs and the same displacement is maintained (1.5 seconds to 2 seconds). This is because the elastic deformation of the seal member 110 is not accomplished according to the displacement of the piston 130 during the high pressure braking, so that the relative slip occurs between the piston 130 and the seal member 110 (1.5 seconds to 2 seconds).

Furthermore, as the braking hydraulic pressure is released (2 to 3 seconds), the displacement y3 of the piston gradually returns to its original position and finally the displacement y3 reaches about 0.3 mm. In addition, the displacement x3 of the seal member is maintained at the same displacement (2 seconds to 2.5 seconds), then gradually returns to its original position, and finally the displacement X3 reaches about 0.4 mm. As described above, the relative slip occurs between the piston 130 and the seal member 110 during the high pressure braking, so that the seal member 110 may not fully implement a rollback function, and as a result, the piston 130 and the seal member 110 may not return to its original positions.

This may cause a fine drag between the brake pad and the disk D due to a non-return of the piston 130, and also cause a decrease in fuel efficiency due to a residual braking torque.

In contrast, looking at the displacements y1, y2, x1 and x3 of the piston and the seal member of the caliper brakes 100 and 200 according to the first and second embodiments of the disclosure according to the change in the braking hydraulic pressure, as the braking hydraulic pressure of 70 bar is applied, the displacements y1 and y2 of the piston increases linearly and finally the displacements y1 and y2 reach 1 mm (1 second to 2 seconds). At this time, the displacements x1 and x2 of the seal member starts from 0.2 mm and increases linearly to reach about 1.5 mm (1 second to 2 seconds). This is because the elastic deformation of the seal member 110 is continuously performed according to the displacement of the piston during the high pressure braking, so that the relative slip does not occur between the piston 130 and the seal member 110.

Furthermore, as the braking hydraulic pressure is released, the displacements y1 and y2 of the piston gradually returns to their original position and finally the displacements y1 and y2 reach 0 mm (2 seconds to 3 seconds). Furthermore, the displacements x1 and x2 of the seal member gradually returns to their original position and finally the displacements x1 and x2 reach about 0.2 mm. As described above, in the embodiments of the disclosure, the relative slip does not occur between the piston 130 and the seal member 110 during the high pressure braking, so that the seal member 110 implements the rollback function, and as a result, the piston 130 and the seal member 110 may return to their original positions.

Hereinafter, a change in the distance between the pad plate and the piston according to the first embodiment of the disclosure and the pad plate and the piston according to the conventional embodiment under different braking hydraulic conditions will be described.

FIG. 22 is a graph illustrating positions of the piston with respect to the pad plate according to the change in the brake hydraulic pressure after the braking operations of the conventional caliper brake and the caliper brake according to the first embodiment of the disclosure.

FIG. 22 shows that a clearance Z1 between the pad plate and the piston of first embodiment of the disclosure and a clearance Z2 between the pad plate and the piston of the conventional embodiment in different braking hydraulic conditions (10, 20, 40, 60, 80 and 100 bar).

Referring to FIG. 22, it may be seen that the clearance Z2 between the pad plate and the piston of the conventional embodiment is maintained at a certain level (about 0.24 mm) in a low pressure region (10, 20 bar), but decreases sharply (up to about 0.08 mm) as the clearance z2 between the piston and the piston goes through a middle pressure region (40, 60 bar) and toward a high pressure region (80, 100 bar). This is because the slip occurs between the piston and the seal member as the braking hydraulic pressure goes to the high pressure region, so that the seal member does not smoothly roll back the piston. Accordingly, in the seal member of the conventional embodiment, the clearance Z2 between the pad plate and the piston is decreased after the braking operation due to the slip phenomenon as the braking hydraulic pressure increases to a high pressure, thereby causing drag, which generates a decrease in fuel efficiency and a decrease in durability of the brake pad.

Meanwhile, it may be seen that the clearance Z1 between the pad plate and the piston according to first embodiment of the disclosure is maintained within a certain value (about 0.18~0.22 mm) even when going from the low pressure region (10, 20 bar) to the high pressure region (80, 100 bar) through the middle pressure region (40, 60 bar). This shows that even when the braking hydraulic pressure changes from the low pressure region to the high pressure region, the slip does not occur between the piston and the seal member, so that the seal member may smoothly roll back the piston.

In other words, the clearance Z2 between the pad plate and the piston of the conventional embodiment has a change width of 0.16 mm from about 0.24 mm to about 0.08 mm from low pressure to high pressure, whereas the clearance Z1 between the pad plate and the piston of first embodiment of the disclosure has a change width of 0.04 mm from about 0.18 mm to about 0.22 mm from low pressure to high pressure, so that the caliper brake of first embodiment of the disclosure may expect constant rollback performance and braking performance from the low pressure region to the high pressure region.

Therefore, the caliper brake according to first embodiment of the disclosure has the advantage of being able to expect constant braking performance even under the braking hydraulic conditions from the low pressure region to the high pressure region, and furthermore, prevent the deterioration of fuel efficiency and durability due to the drag phenomenon.

The exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

The invention claimed is:
1. A caliper brake, comprising:
a carrier in which a pair of pad plates are installed to move forward and backward toward a disk;
a caliper housing slidably installed on the carrier and provided with a cylinder;
a piston installed in the cylinder and configured to move forward and backward toward the pair of pad plates by a braking hydraulic pressure;
a seal groove formed to be recessed in an annular shape on an inner surface of the cylinder; and
a seal member accommodated in the seal groove, the seal member including a front surface located in a forward direction of the piston, a rear face located in a backward direction of the piston, an inner circumferential surface in close contact with an outer circumferential surface of the piston, and an outer circumferential surface in close contact with a seating surface of the seal groove;

wherein the front surface is provided with a protrusion from which at least a part thereof protrudes, wherein the seal groove is divided into a first space formed below the protrusion, a second space formed above the protrusion, and wherein the second space is formed with a smaller volume than the first space, the second space is filled before the first space by elastic deformation of the seal member when the piston moves forward, wherein the seal groove comprises the seating surface on which the outer circumferential surface of the seal member is seated, a front braking surface facing the front surface of the seal member, and a front inclined surface inclined from the front braking surface in the forward direction of the piston, wherein at least a part of the protrusion is provided in close contact with both the front braking surface and the front inclined surface of the seal groove when the piston moves forward.

2. The caliper brake of claim 1, wherein a thickness D1 of an outer end of the seal member is smaller than a thickness D2 of a middle portion of the seal member.

3. The caliper brake of claim 1, wherein a thickness D3 of an inner end of the seal member is smaller than the thickness D2 of the middle portion of the seal member.

4. The caliper brake of claim 1, wherein a center part of the protrusion is in close contact with the front braking surface when the piston moves forward.

5. The caliper brake of claim 1, wherein the seal groove includes a third space provided at a rear side of the seal member.

6. The caliper brake of claim 1, wherein the protrusion is formed to protrude at regular intervals along a circumferential direction.

7. The caliper brake of claim 1, wherein a rear protrusion protruding toward the rear braking surface is provided on the rear surface of the seal member.

8. The caliper brake of claim 1, wherein the seal groove comprises a rear braking surface facing the rear surface of the seal member, and a rear inclined surface inclined from the rear braking surface in the backward direction of the piston.

9. The caliper brake of claim 1, wherein the seal groove further comprises a front chamfer inclined at a front portion of the seating surface, and a rear chamfer inclined at a rear portion of the seating surface.

10. A caliper brake, comprising:
a carrier in which a pair of pad plates are installed to move forward and backward toward a disk;
a caliper housing slidably installed on the carrier and provided with a cylinder;
a piston installed in the cylinder and configured to move forward and backward toward the pad plates by a braking hydraulic pressure;
a seal member in close contact with an outer surface of the piston and an inner surface of the cylinder, the seal member having a ring-shaped;
a seal groove formed to be recessed in the inner surface of the cylinder to accommodate the seal member, the seal groove including a seating surface on which an outer circumferential surface of the seal member is seated, a front braking surface facing a front surface of the seal member, and a front inclined surface formed to be inclined in a forward direction of the piston from the front braking surface; and
an elastic member accommodated in the seal groove and provided in front of the seal member, the elastic member having a ring-shaped;

wherein at least a part of the elastic member is in close contact with the front inclined surface when the piston moves forward, wherein an inner space of the seal groove is divided into a first space positioned in front of the seal member and provided between the elastic member and the piston, a second space positioned in front of the seal member and provided between the elastic member and the seating surface, and wherein the second space is formed with a smaller volume than the first space, the second space is filled before the first space by elastic deformation of the seal member when the piston moves forward, wherein the seal groove comprises the seating surface on which the outer circumferential surface of the seal member is seated, the front braking surface facing the front surface of the seal member, and the front inclined surface inclined from the front braking surface in the forward direction of the piston, wherein one side of the elastic member is provided in close contact with the front surface of the seal member, and the other side thereof is provided in close contact with both the front braking surface and the front inclined surface.

11. The caliper brake of claim 10, wherein the seal groove comprises a rear braking surface facing a rear surface of the seal member, and a rear inclined surface inclined from the rear braking surface in a backward direction of the piston.

12. The caliper brake of claim 10, wherein the seal groove further comprises a front chamfer inclined at a front portion of the seating surface, and a rear chamfer inclined at a rear portion of the seating surface.

13. The caliper brake of claim 12, wherein an outer end of the elastic member is supported by the front chamfer.

14. The caliper brake of claim 10, wherein an inner space of the seal groove include a third space positioned at a rear side of the seal member.

15. The caliper brake of claim 10, wherein the elastic member is provided in the form of a ring having an inner diameter larger than an outer diameter of the piston and an outer diameter thereof smaller than an inner diameter of the seal groove.

* * * * *